US008429956B2

(12) United States Patent
Borgers et al.

(10) Patent No.: US 8,429,956 B2
(45) Date of Patent: Apr. 30, 2013

(54) PRESSURE-MEASURING PLUG FOR A COMBUSTION ENGINE

(75) Inventors: Marc Gerard Johan Borgers, Enschede (NL); Serge Groenhuijzen, Borne (NL); Cristobal Ruiz Zwollo, Enschede (NL); Jan-Willem Sloetjes, Wierden (NL)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 13/229,799

(22) Filed: Sep. 12, 2011

(65) Prior Publication Data
US 2012/0227477 A1    Sep. 13, 2012

(30) Foreign Application Priority Data
Oct. 20, 2010  (EP) .................... 10188232

(51) Int. Cl.
*G01M 15/08* (2006.01)
(52) U.S. Cl.
USPC ................................................ 73/114.18
(58) Field of Classification Search .......... 73/114.16, 73/114.18, 114.19, 114.21
See application file for complete search history.

(56) References Cited

U.S. PATENT DOCUMENTS

| 6,539,787 | B1* | 4/2003 | Murai et al. ........... 73/114.21 |
| 6,575,039 | B2* | 6/2003 | Murai et al. ........... 73/756 |
| 7,159,448 | B2* | 1/2007 | Moelkner et al. ........... 73/35.12 |
| 7,337,657 | B2 | 3/2008 | Haussner et al. |
| 7,431,003 | B2 | 10/2008 | Ludwig et al. |
| 7,581,520 | B2* | 9/2009 | Kern et al. ........... 123/145 A |
| 7,635,826 | B2* | 12/2009 | Yamada et al. ........... 219/270 |
| 7,730,771 | B2* | 6/2010 | Ludwig et al. ........... 73/114.19 |
| 8,250,909 | B2* | 8/2012 | Kern et al. ........... 73/114.16 |
| 2001/0008090 | A1* | 7/2001 | Murai et al. ........... 73/756 |
| 2007/0289370 | A1* | 12/2007 | Hirose et al. ........... 73/116 |
| 2007/0295710 | A1* | 12/2007 | Yamada et al. ........... 219/270 |
| 2009/0320576 | A1 | 12/2009 | Borgers et al. |

FOREIGN PATENT DOCUMENTS

EP    2138819    12/2009

* cited by examiner

Primary Examiner — Freddie Kirkland, III
(74) Attorney, Agent, or Firm — Chapin IP Law, LLC

(57) ABSTRACT

A piezoresistive pressure-measuring plug for a combustion engine. The pressure-measuring plug includes a plug body having a threaded plug body part with an external thread for screwing the plug body into a cylinder of the combustion engine, and a sealing plug body part forming a tip of the plug for providing a seal between the plug body and the combustion engine. The plug body further includes a sensing body part positioned between the threaded plug body part and the sealing plug body part. The sensing body part includes a cylindrical body part, a moving part, and a sensing structure that form a single integral piece. The sensing structure forms a connection between the cylindrical body part and the moving part, and allows the moving part to move relatively to the cylindrical body part along a cylinder axis of the cylindrical body part.

20 Claims, 3 Drawing Sheets

PRESSURE-MEASURING PLUG FOR A COMBUSTION ENGINE

TECHNICAL FIELD OF THE INVENTION

The invention relates to a pressure-measuring plug for a combustion engine comprising a plug body and a sensing structure, wherein the plug body comprises a threaded plug body part comprising an external thread for screwing the plug body into a cylinder of the combustion engine and a sealing plug body part forming a tip of the plug and configured for providing a seal between the plug and the combustion engine. More particularly, the invention relates to a piezo-resistive pressure-measuring plug for a combustion engine.

BACKGROUND OF THE INVENTION

Advanced combustion strategies for diesel and otto engines in the future depend on the existence of accurate pressure feedback from each cylinder during the entire engine cycle (compression—combustion—exhaust cycle). These strategies may or may not include HCCI combustion, and can result in high pressure release rates which require fast and accurate pressure response.

A pressure-measuring plug of the above-mentioned type is known from EP2138819A1. A moving rod is arranged in the plug body. A sensing structure, is arranged between the rod and the plug body in such a way that the sensing structure is acted upon by the pressure prevailing in the combustion chamber of the cylinder, whereby the rod transmits the pressure in the combustion chamber of the cylinder to the sensing structure. The rod is arranged in the plug body so as to be displaceable in a sliding manner in the axial direction relative to the plug body, so that the pressure in the combustion chamber leads to an axial motion of the heating rod relative to the plug body, as a result of which motion the sensing structure is acted upon by a force.

SUMMARY OF THE INVENTION

It is an object of the present invention to provide an improved pressure-measuring plug free of at least one of the above noted prior art limitations. Another object of the invention to provide a pressure measuring plug which is at least one of: reliable, cheaper to manufacture, long lasting and/or robust to harsh pressure media, withstanding the high temperature and vibration typical of an internal combustion engine.

According to the invention, this object is achieved by pressure measuring plug having the features of Claim 1. Advantageous embodiments and further ways of carrying out the invention may be attained by the measures mentioned in the dependent claims.

According to the invention, the plug comprises a plug body which comprises a sensing body part positioned between the threaded plug body part and the sealing plug body part. The sensing body part is made from one piece and comprises a cylindrical body part; a moving part and the sensing structure. The sensing structure forms a connection between the cylindrical body part and the moving part and allows the moving part to move relatively to the cylindrical body part along a cylinder axis of the cylindrical body part when the pressure in a combustion chamber or cylinder of a combustion engine varies.

These features enable one to manufacture a pressure measuring plug with less components. Compared with the device shown in EP2138819A1, the sensing structure is an integral part of a part of the plug body and no annular weld is needed to couple the sensing structure to the plug body. Furthermore, no weld is needed to couple the moving rod to the sensing structure. As less welds have to be made, the number of processing steps is decreased and consequently the production costs of the pressure measuring device are reduced. A further advantage of a sensing structure which is combined in one piece with a part of the plug body, is that there are no welds anymore which are stressed by the pressure acting on the rod. This improves the life time of the plug. The sealing part of the plug body has to form a hermetic seal between plug body and engine. Consequently, the welds to couple the pressure sensing part to the threaded plug body part and the sealing part of the plug body, respectively, are not stressed by the pressure of the medium. The pressure sensing part of the plug body is clamped between the threaded plug body part and the sealing part of the plug body.

In an embodiment, the cylindrical body part of the sensing body part has a thickness which is larger than the threaded body part and/or sealing plug body part. These features makes the pressure-measuring plug according to the invention significantly less sensitive to the influence of mounting and torque forces.

In an embodiment, piezo resistive elements are attached to an annular surface of the sensing structure, wherein the annular surface is in a plane perpendicular to the cylinder axis. More particularly, the sensing structure comprises a hole to form the annular surface, wherein the hole is located in line with the moving part. Furthermore, the hole is located centrally in the sensing structure. In an embodiment, the centre of the sensing structure coincides with the cylinder axis of the plug body. These features improve the stress distribution in the surface to which the piezo resistive elements are attached, making the sensing structure more sensitive to measure pressure.

In an embodiment, the hole in the sensing structure is a through hole extending along the cylinder axis through the sensing structure and the moving part. This feature enables manufacture one sensing body part which is suitable to be used for different application. For example, by attaching a dummy rod in the through hole, the sensing body part could be used in a plug to measure pressure only. By attaching a glow rod in the through hole, the sensing body part could be used in a combined pressure measuring and glow plug. By attaching a temperature sensor in the through hole, the sensing body part could be used in a combined pressure/temperature measuring plug.

In an embodiment, the sensing body part comprises an annular recess configured for receiving an end of the threaded body part, positioning the sensing structure in the threaded body part and providing an annular space between the sensing structure and the threaded body part. These features provide a sensing body part which is less sensitive to thermal shock due to welding the threaded body part to the sensing body part.

In a further embodiment, the annular recess further provides a decoupling groove in the sensing body part between the cylindrical body part and the sensing structure. These features reduce further the sensitivity of the pressure-measuring plug with respect to mounting and torque forces in the plug body.

In an embodiment, the sensing body part is an element which is concentric along the cylinder axes of the plug body. This feature makes that the stress in the annular surface is evenly distributed around the cylinder axis, making the placement of the piezo-resistive element less critical.

In an embodiment, the sensing body part is a metal injection moulded part. In this way, the sensing body part could easily be manufactured with high accuracy. Furthermore, the material to manufacture the sensing body part by means of injection moulding is cheaper than when it is made from one piece of stainless steel by a metal cutting process.

In an embodiment, the plug further comprises an annular membrane with an outer first rim and an inner second rim. The first rim is welded to an outer edge of the cylindrical body part. The second rim is welded to the moving body part. The annular membrane provides a seal between the cylindrical body part and the moving body part. The membrane guarantees that the moving part of the sensing structure can move friction-free in the axial direction in the cylindrical plug body part and protects the sensing structure from the extreme temperatures resulting from the combustion process. It also defines the pressure sensitive area.

It will be clear that the various aspects mentioned in this patent application may be combined and may each be considered separately for a divisional patent application. Other features and advantages of the invention will become apparent from the following detailed description, taken in conjunction with the accompanying drawing which illustrate, by way of example, various features of preferred embodiments of the invention.

BRIEF DESCRIPTION OF THE DRAWINGS

These and other aspects, properties and advantages and details of the invention will be explained hereinafter based on the following detailed description of exemplary embodiments with reference to the drawings, wherein like reference numerals denote like or comparable parts, and in which.

DETAILED DESCRIPTION OF EXEMPLARY EMBODIMENTS

Figure 1:
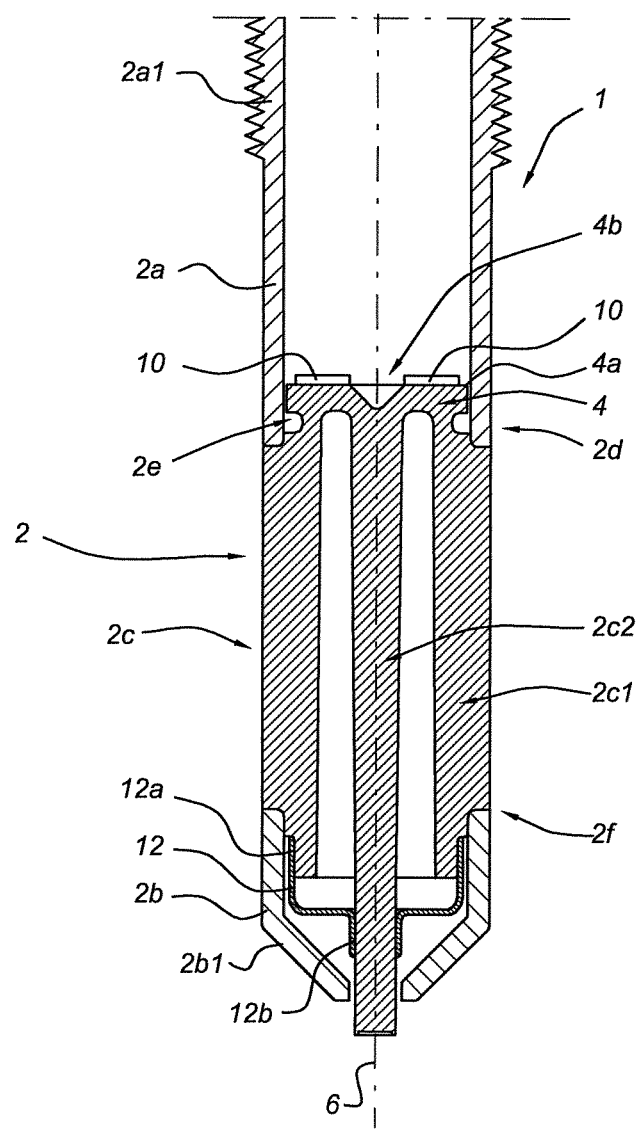
FIG. 1 is a cross sectional view of a first embodiment of a pressure measuring plug according to the invention.

Referring to the drawings, FIG. 1 illustrates a first embodiment of an improved pressure measuring plug 1 made in accordance with the invention. Only the part of the pressure measuring plug from the thread to the top of the plug are shown. The part of the plug from the thread up to the connector are not shown as the invention does not depend on said part. Similarly, the sensor electronics, which could be provided on a PWB in the plug body, is not shown.

In the example of the embodiment shown in FIG. 1, plug body 2 comprises a threaded body part 2a, a sensing body part 2c and a sealing body part 2b, which are connected together mechanically through welding. The sealing body part 2b is provided on the combustion chamber side with a sealing cone 2b1, by means of which the pressure measuring plug seals off the combustion pressure at the cylinder head. The threaded body part 2a, which comprises an external thread to screw the pressure measuring plug 1 into an opening in the combustion engine to a combustion chamber.

The sensing body part 2c is made of one piece and includes a cylindrical body part 2c1, a sensing structure 4 and a moving part 2c2. The sensing structure 4 couples the moving part 2c2 to the cylindrical body part 2c1 at the sides facing the threaded body part 2a. The outer facing surface of the cylindrical body part 2c1 forms a part of the outside of the plug body. Piezo resistive elements 10 are attached to an annular surface 4a of the sensing structure 4 of the sensing body part 2c. The annular surface 4a is in a plane which is perpendicular to cylinder axis (6).

The sensing structure 4 comprises a hole 4b to form the central opening in the annular surface. The hole 4b is located in line with axis 6 of the moving part 2c. It should be noted that the axis symmetry 6 of the sensing body part 2c coincides with body axis of the moving part 2c2 and the body axis of the cylindrical body part 2c1.

The sensing body part 2c comprises an annular recess 2d configured for receiving an end of the threaded body part 2a. When the end of the threaded body part is received in the annular recess, the sensing structure 4 is positioned in the threaded body part 2a. An annular space between the sensing structure 4 and the inside of threaded body part 2a improves the measuring characteristics of the measuring plug.

The annular recess 2d further provides a decoupling groove 2e in the sensing body part 2c between the cylindrical body part 2c1 and the sensing structure 4. In this way the stiffness of the material between the sensing structure 4 and cylindrical body part 2c1 is reduced. This reduces the sensitivity of the pressure measuring plug with respect to mounting forces. When the two parts are welded together, after cooling down, some stress will occur in the welding area. This stress could be reduced by the decoupling groove 2e and/or positioning the sensing structure 4 at distance from the welding area.

From FIG. 1 can be seen that the cylindrical body part 2c1 of the sensing body part 2c has a thickness which is larger than thickness of the annular wall of the threaded body part and/or sealing plug body part.

The sensing body part 2c could be made by a metal injection moulding MIM process or a metal cutting process. It has been found that the MIM process is an cost effective process to reduce the cost of manufacturing.

The sensing body part comprises another annular recess 2f for receiving the sealing body part 2b of the plug body 2. The annular recess 2f is further configured to form an outer edge of the sensing body part 2c to receive a flexible annular membrane 12. The annular membrane 12 is an S-shaped membrane and comprises a first rim 12a and a second rim 12b The profile of the first rim 12a encompasses the profile of the second rim 12b. The first rim 12a is welded to an outer edge of the cylindrical body part 2c. The second rim 12b is welded to the moving body part 2c. The annular membrane 12 provides a seal between the cylindrical body part 2c and the moving body part 2c2 and protects the sensing structure 4 against the harsh environment in the combustion chamber, more particular protects the sensing elements 10 mounted on the sensing structure against the hot combustion gasses. The membrane 12 further reduces the radial movement of the tip of the moving part which improves the measuring characteristics of the sensing structure 4.

Figure 2:
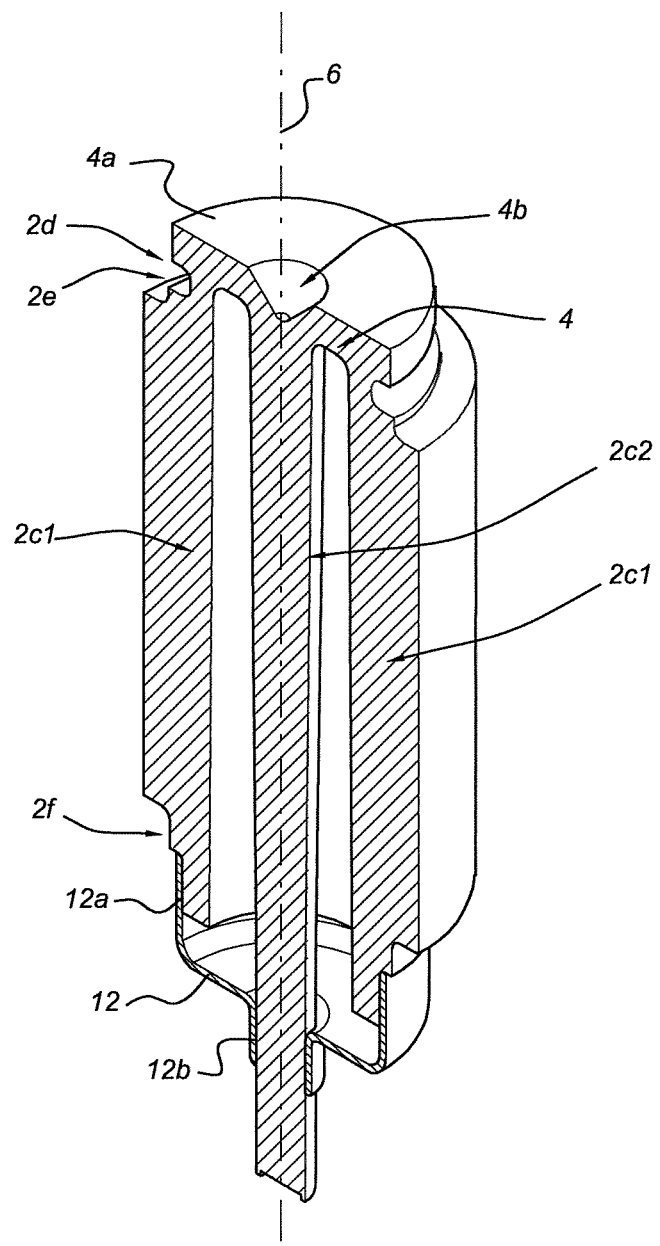
FIG. 2 is a perspective view of the sensing body part and membrane shown in FIG. 1; and, FIG. 3 is a cross sectional view of a second embodiment of a pressure measuring plug according to the invention.

FIG. 2 shows a perspective view of the sensing body part 2c and membrane 12 shown in FIG. 1. Both the sensing body part 2c and the membrane 12 are concentric parts. By using a MIM process to obtain the sensing body part 2c, the concentricity of the sensing body part 2c could be improved.

The pressure-measuring glow plug shown in the drawings works in the following manner. As a result of the combustion pressure or the compression pressure of the piston, the moving part 2c2 is displaced in the axial direction 6 with respect to the cylindrical body part 2c1 of the sensing body part 2c. The annular surface 4a of the sensing structure 4 will deform resulting in surface stress. A piezo-resistive sensor, a wire strain gauge or a similar measuring element 10 attached to the surface 4a will sense the amount of stress from which the sensor electronics will determine a value representative for the pressure acting on the plug.

Thus, the sensing structure 4 transforms an axial movement of the moving part 2c2 in a surface strain in radial direction. The piezo-resistive elements 10 mounted on the annular surface of the sensing structure 4 provides a resistance change representing the surface strain in radial direction when the moving part 2c2 is moved in axial direction along the axis of symmetry 6.

The membrane 12 is preferably made from a metallic material and is connected mechanically to the moving part 2c2 and the body part 2c1, for example, by means a radial circumferential fillet weld or a radial circumferential through-weld. The connection can also be achieved by means of laser welding, crimping, swaging, soldering, press-fit etc. The membrane 12 can be in the form of a membrane as shown in FIG. 1 or FIG. 3 or a bellows-like seal (not shown).

Figure 3:
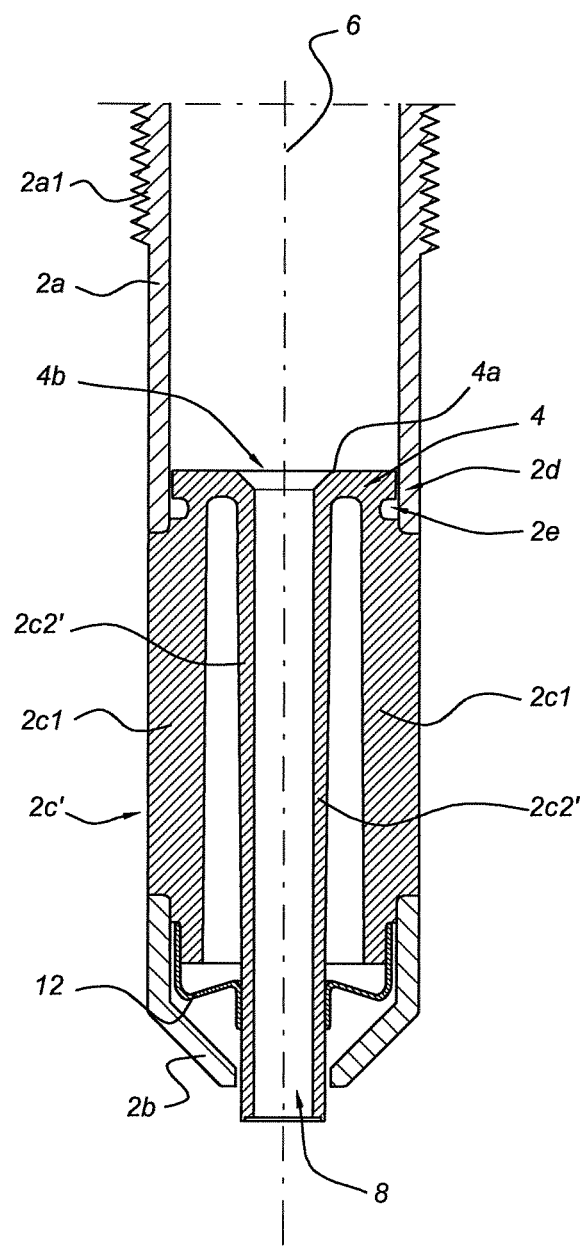

FIG. 3 shows a second embodiment of a pressure measuring plug 1 according to the invention which embodiment has many points in common with the first embodiment shown in FIGS. 1 and 2. The solid moving part 2c2 in the first embodiment is replaced by an elongated interface body 2c2' comprising a longitudinal through hole 8 for positioning a rod. The rod could be a dummy rod, a glow rod, temperature sensing rod, spark plug. The through hole 8 ends at a side in the central hole 4b of the sensing structure 4.

The second embodiment enables calibration of the pressure measuring plug before the plug is finalized, i.e. before a heating rod, temperature measuring rod or dummy rod is welded to the hollow moving part 2c2'. This allows to manufacture a calibrated pressure measuring plug sub assembly and that another manufacturer can finalize the plug by mounting the required rod to the sub assembly, i.e. to obtain a combined pressure measuring/glow plug, combined pressure and temperature measuring plug or pressure measuring plug with dummy rod. As the mounting of the rod to the elongated interface body does not introduce an offset or sensitivity shift in the sensing structure no additional calibration is needed. Therefore a pressure calibration is feasible before welding the final rod to the sensor, by using a temporary seal member to close the through hole 8. The plug provided with detachable seal member can be pressure-calibrated. By detaching the seal member, a calibrated pressure measuring plug sub assembly is obtained which could be finalized by a third party by welding the final rod to the free end of the elongated interface body 2c2', thus providing the necessary closing of the through hole 8. The attachment of the final rod and mounting the finalized plug in an engine will not influence the characteristics of the pressure measurement part of the plug such that a subsequent calibration is needed before using the pressure signal generated by the plug to control the engine.

It should be noted that the elongated interface body 2c2' could be made from two or more parts which are mechanically connected by means of laser welding, crimping, swaging, soldering, press-fit etc. In that case the sensing body part 2c comprises the body part 2c1, sensing structure 4 and a short moving part. An elongated hollow interface body is than attached to the short hollow moving part at an end facing away from the sensing structure 4 to obtain a structure having similar characteristics as the embodiment shown in FIG. 3.

According to the invention the combustion pressure acts on the external surface of the rod. The pressure acting on the rod and membrane 12 is transferred by the hollow moving part 2c2' to the sensing structure 4 and in this way translated into a force acting on the sensing structure 4. The moving part 2c2' moves along its longitudinal axis 6 due to pressure changes.

The threaded body part 2a and sealing part 2b are preferably made of a high-resistance stainless steel, such as a precipitation hardening stainless steel with high strength and hardness, excellent corrosion resistance and easy heat treatment.

The sensing body part 2c could be manufactured by a Metal Injection Moulding MIM process. The strain gauges could be Microfused Silicon Strain Gauge made by a Micro Electro Mechanical System (MEMS) process and could be glass-bonded to the sensing structure 4. The membrane 12 is preferably made of an oxidation and corrosion resistant material well suited for service in extreme environments. Inconel alloys are examples of such a material.

The measures described hereinbefore for embodying the invention can obviously be carried out separately or in parallel or in a different combination or if appropriate be supplemented with further measures; it will in this case be desirable for the implementation to depend on the field of application of the device. It should be understood that although particular embodiments of the invention have been described by way of illustrating the invention, the invention includes all modifications and equivalents thereof falling within the scope of the appended claims.

The invention claimed is:

1. A pressure-measuring plug (1) for a combustion engine comprising:
   a plug body (2) including:
      a threaded plug body part (2a) having an external thread for screwing the plug body (2) into a cylinder of the combustion engine;
      a sealing plug body part (2b) forming a tip of the pressure-measuring plug (1) and configured for providing a seal between the pressure-measuring plug and the combustion engine; and
      a sensing body part (2c) positioned between the threaded plug body part (2a) and the sealing plug body part (2b),
   wherein the sensing body part (2c) has a cylindrical body part (2c1), a moving part (2c2), and a sensing structure (4),
   wherein the cylindrical body part (2c1), the moving part (2c2), and the sensing structure (4) form a single integral piece, and
   wherein the sensing structure (4) forms a connection between the cylindrical body part (2c1) and the moving part (2c2), and allows the moving part (2c2) to move relatively to the cylindrical body part (2c1) along a cylinder axis (6) of the cylindrical body part (2c1).

2. The pressure-measuring plug according to claim 1, wherein the sensing structure (4) has an annular surface (4a), which is disposed in a plane perpendicular to the cylinder axis (6), and wherein piezoresistive elements (10) are attachable to the annular surface (4a).

3. The pressure-measuring plug according to claim 2, wherein the sensing structure (4) comprises a hole (4b) to form the annular surface, and wherein the hole (4b) is located in-line with the moving part (2c2).

4. The pressure-measuring plug according to claim 3, wherein the hole (4b) is a through-hole (8) extending along the cylinder axis (6) through the sensing structure (4) and the moving part (2c2).

5. The pressure measuring plug according to claim 1, wherein the sensing body part (2c) comprises an annular recess (2d) configured for receiving an end of the threaded body part (2a), positioning the sensing structure in the threaded body part (2a) and providing an annular space between the sensing structure (4) and the threaded body part (2a).

6. The pressure measuring plug according to claim 5, wherein the annular recess (2d) further provides a decoupling groove (2e) in the sensing body part (2c) between the cylindrical body part (2c1) and the sensing structure (4).

7. The pressure-measuring plug according to claim 1, wherein the cylindrical body part of the sensing body part has a thickness which is larger than that of one or both of the threaded plug body part and the sealing plug body part.

8. The pressure-measuring plug according to claim 1, wherein the sensing body part (2c) is a concentric element along the cylinder axis (6).

9. The pressure-measuring plug according to claim 1, wherein the sensing body part (2c) is a metal injection molded part.

10. The pressure-measuring plug according to claim 1, further comprising an annular membrane (12) having a first rim and a second rim, wherein the first rim is welded to an outer edge of the cylindrical body part (2c1) and wherein the second rim is welded to the moving body part (2c2) to provide a seal between the cylindrical body part (2c1) and the moving body part (2c2).

11. A pressure-sensing element (2c) for use in a pressure-measuring plug (1) for a combustion engine, comprising:
 a cylindrical body part (2c1);
 a moving part (2c2); and
 a sensing structure (4),
 wherein the cylindrical body part (2c1), the moving part (2c2), and the sensing structure (4) form a single integral piece, and
 wherein the sensing structure (4) forms a connection between the cylindrical body part (2c1) and the moving part (2c2), and allows the moving part (2c2) to move relatively to the cylindrical body part (2c1) along a cylinder axis (6) of the cylindrical body part (2c1).

12. The pressure-sensing element according to claim 11, wherein the sensing structure (4) has an annular surface (4a) which is disposed in a plane perpendicular to the cylinder axis (6), and wherein piezoresistive elements (10) are attachable to the annular surface (4a).

13. The pressure-sensing element according to claim 12, wherein the sensing structure (4) comprises a hole (4b) to form the annular surface, and wherein the hole (4b) is located in-line with the moving part (2c2).

14. The pressure-sensing element according to claim 13, wherein the hole (4b) is a through-hole (8) extending along the cylinder axis (6) through the sensing structure (4) and the moving part (2c2).

15. The pressure-sensing element according to claim 11, further comprising an annular membrane (12) having a first rim and a second rim, wherein the first rim is welded to an outer edge of the cylindrical body part (2c1), and wherein the second rim is welded to the moving body part (2c2) to provide a seal between the cylindrical body part (2c1) and the moving body part (2c2).

16. A pressure-measuring plug (1) for a combustion engine, comprising:
 a plug body (2) including:
  a threaded plug body part (2a) having an external thread for screwing the plug body (2) into a cylinder of the combustion engine;
  a sealing plug body part (2b) forming a tip of the pressure-measuring plug (1) and configured for providing a seal between the pressure-measuring plug and the combustion engine; and
  a sensing body part (2c) positioned between the threaded plug body part (2a) and the sealing plug body part (2b), the sensing body part (2c) having a cylindrical body part (2c1), a moving part (2c2), and a sensing structure (4),
 wherein the cylindrical body part (2c1), the moving part (2c2), and the sensing structure (4) are made from one piece and form an integral part of the plug body, and
 wherein the sensing structure (4) forms a connection between the cylindrical body part (2c1) and the moving part (2c2), and allows the moving part (2c2) to move relatively to the cylindrical body part (2c1) along a cylinder axis (6) of the cylindrical body part (2c1).

17. The pressure-measuring plug according to claim 16, wherein the sensing structure (4) has an annular surface (4a) which is disposed in a plane perpendicular to the cylinder axis (6), and wherein piezoresistive elements (10) are attachable to the annular surface (4a).

18. The pressure-measuring plug according to claim 17, wherein the sensing structure (4) comprises a hole (4b) to form the annular surface, and wherein the hole (4b) is located in-line with the moving part (2c2).

19. The pressure-measuring plug according to claim 18, wherein the hole (4b) is a through-hole (8) extending along the cylinder axis (6) through the sensing structure (4) and the moving part (2c2).

20. The pressure-measuring plug according to claim 16, further comprising an annular membrane (12) having a first rim and a second rim, wherein the first rim is welded to an outer edge of the cylindrical body part (2c1), and wherein the second rim is welded to the moving body part (2c2) to provide a seal between the cylindrical body part (2c1) and the moving body part (2c2).

* * * * *